United States Patent [19]
Toyoda

[11] 3,921,183
[45] Nov. 18, 1975

[54] AUTOMATIC EXPOSURE CONTROL SYSTEMS AND LIGHT METERING SYSTEMS FOR CAMERAS

[75] Inventor: Kenji Toyoda, Tokyo, Japan
[73] Assignee: Nippon Kogaku K.K., Tokyo, Japan
[22] Filed: Apr. 16, 1974
[21] Appl. No.: 461,383

[30] Foreign Application Priority Data
Apr. 25, 1973 Japan.............................. 48-46117

[52] U.S. Cl................ 354/23 D; 250/206; 250/215; 354/51; 354/60 E; 356/226
[51] Int. Cl.²... G03B 7/08; G03B 17/18; G01J 1/44
[58] Field of Search...... 354/24, 50, 51, 60 R, 60 E, 354/60 L, 23 D; 356/226, 227; 250/206, 215

[56] References Cited
UNITED STATES PATENTS

| | | |
|---|---|---|
| 3,703,130 | 11/1972 | Watanabe............................ 354/24 |
| 3,827,065 | 7/1974 | Wada.................................... 354/51 |
| 3,836,262 | 9/1974 | Yata et al. ......................... 356/226 |

*Primary Examiner*—Joseph F. Peters, Jr.
*Attorney, Agent, or Firm*—Shapiro and Shapiro

[57] ABSTRACT

In a digital-counter type automatic exposure control system for storing information relating to object brightness without logarithmic reduction, a photoelectric cell is connected in series with a resistor circuit having a resistance which varies in accordance with the count number stored in a reversible counter, the count number being automatically adjusted so that the voltage at the junction of the resistor circuit and the photoelectric cell is maintained at a predetermined level. The resistor circuit may be switched into series connection with a capacitor upon opening of the shutter for producing a shutter control signal. In another embodiment a photovoltaic cell is used.

22 Claims, 2 Drawing Figures

AUTOMATIC EXPOSURE CONTROL SYSTEMS AND LIGHT METERING SYSTEMS FOR CAMERAS

BACKGROUND OF THE INVENTION

1. Field of the Invention

The present invention relates to automatic exposure control systems having digital memory means for storing information representing light intensity without logarithmic reduction, and to improved light metering circuity for use in such systems.

2. Description of the Prior Art

In TTL cameras of the type having automatic exposure control systems, exposure of the film is controlled in response to the output of a photoelectric element disposed behind the camera lens. When a picture is taken, the photoelectric element is retracted from the optical path before the shutter opens so that light is no longer incident upon the photoelectric element. Memory means is therefore provided for storing the output of the photoelectric element immediately before the element is retracted, and exposure is controlled in accordance with the output stored in the memory means. It has been proposed to use a digital counter as the memory means because the output of the photoelectric element may be held for a long time and because digital display elements, such as light-emitting diodes, liquid crystals, light bulbs and the like, may be employed to display the exposure time or the stop value to be controlled. With respect to visual effects and mechanical strength, digital-counter type memories are superior to memory means in which an ammeter serves as the display element.

In order that the exposure may be controlled over a wide range with a high degree of accuracy, logarithmic reduction is employed, wherein the intensity of light incident upon the photoelectric element is converted into a signal of magnitude proportional to a logarithm of light intensity, and this signal is stored in the memory means. Consequently, a logarithmic expansion circuit is required for converting the stored, logarithmically reduced signal into a signal proportional to the exposure time, for example. The electrical characteristics of the component parts of circuits of this type are generally considerably dependent upon the environmental temperature so that temperature compensation circuitry is required. As a result, conventional exposure control circuits based on the so-called logarithmic reduction principle are very complex in construction.

SUMMARY OF THE INVENTION

Accordingly, a principal object of the present invention is to provide an automatic exposure control system which stores information representing the intensity of light in a digital counter without logarithmic reduction, which employs digital display elements for displaying the exposure time or stop value to be controlled, which controls the exposure over a wide range with a higher degree of accuracy than prior art exposure control systems, and which is simple in construction and very compact in size.

Another object of the invention is to provide improved light metering circuitry which may be employed in automatic exposure control systems of the above-described type.

Briefly stated, an automatic exposure control system in accordance with the invention employs light metering circuitry having a photoelectric cell for detecting object brightness connected in series with a resistor circuit having a resistance which varies in accordance with the count number stored in a counter, which may be a reversible binary counter. The count number is automatically adjusted to maintain the voltage at the junction of the photoelectric cell and the resistor circuit at a predetermined level so that the count number and the resistance of the resistor circuit are proportional to the object brightness. The resistor circuit may comprise part of the means for controlling an exposure factor, such as the shutter speed. In another embodiment a photovoltaic cell is used.

BRIEF DESCRIPTION OF THE DRAWINGS

The above and other objects, features and advantages of the present invention will become more apparent from the following description of the preferred embodiments thereof taken in conjunction with the accompanying drawings, in which.

DESCRIPTION OF THE PREFERRED EMBODIMENTS

Figure 1:
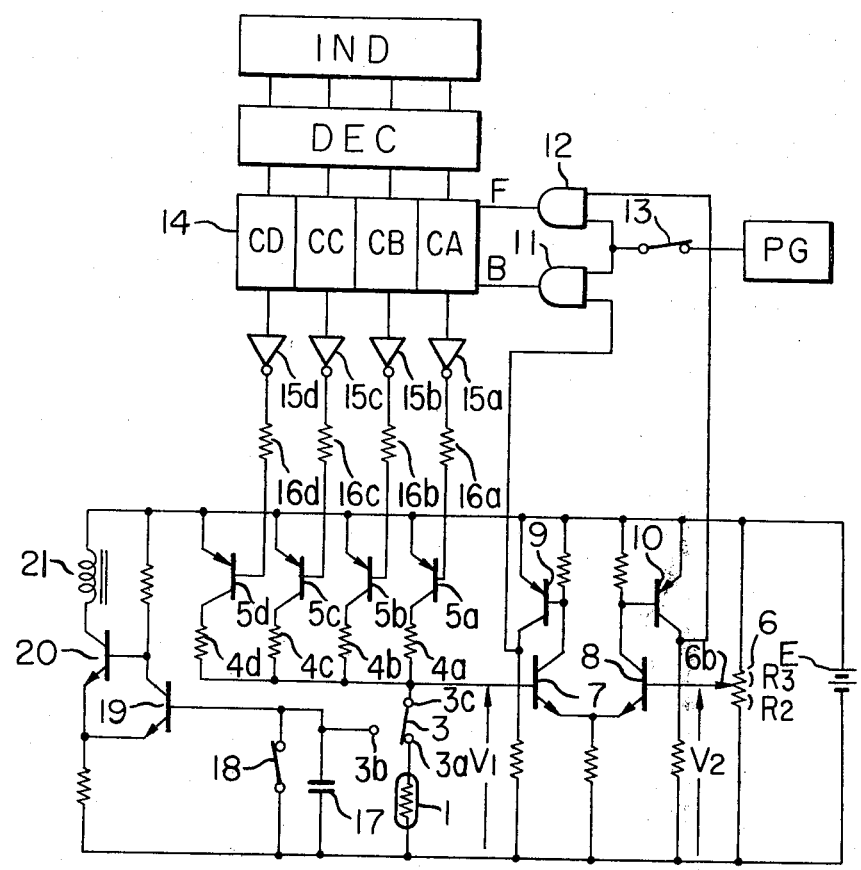
FIG. 1 is a circuit diagram, partly in schematic and partly in block form, showing an automatic exposure control system in accordance with the invention.

Referring to FIG. 1, a light-responsive device, such as a photoelectric cell 1, is located in the optical path of a camera lens, and has one terminal connected to the negative terminal of a power source E and the other terminal connected to a stationary contact 3a of a selection switch 3. One terminal of each of the weighted resistors 4a, 4b, 4c and 4d are connected to the movable contact 3c of the selection switch 3, while the other terminals are connected through switching transistors 5a, 5b, 5c and 5d, respectively, to the positive terminal of the power source E. The armature or brush 6a of a variable resistor or potentiometer 6, which also functions as a bleeder resistor, is positioned in accordance with exposure factors other than the shutter speed (i.e., exposure time) and the brightness of a subject, that is, in accordance with the film speed or the stop value of the camera lens. The movable contact 3c of selection switch 3 normally contacts the stationary contact 3a, but is switched into contact with stationary contact 3b immediately before the camera shutter is opened. When movable contact 3c contacts the stationary contact 3a, the variable resistor 6, the photoelectric cell 1 and the weighted resistors 4a, 4b, 4c and 4d form a bridge circuit with respect to the power source. The outputs of this bridge circuit, that is, the voltages at contact 3c of selection switch 3 and at the armature or brush 6a of the variable resistor 6, are applied to first and second terminals, respectively, of a comparator circuit comprising transistors 7, 8, 9, and 10. The outputs of the comparator circuit are the collector voltages of transistors 9 and 10. These voltages, which are different in phase, are applied to the first input terminals of two-input AND gates 11 and 12, respectively.

A pulse generator PG, which generates pulses at a predetermined frequency, is connected through a memory switch 13 to the other input terminals of AND gates 11 and 12. The memory switch 13 is adapted to be opened immediately before the light to the photoelectric cell 1 is interrupted (i.e., before the photocell is retracted from the optical path) for thereby interrupting the transmission of the pulses from the pulse generator PG to AND gates 11 and 12.

A reversible or up-down binary counter 14 has two input terminals F and B. When pulses are applied to input terminal F, the count number stored in the counter is incremented by each incoming pulse so that the counter counts in the ascending order. When pulses are applied to the input terminal B, the count number stored in the counter is decremented by each incoming pulse so that the counter counts in the descending order. When pulses are simultaneously applied to both input terminals F and B, the count number does not change. The counting stages of up-down counter 14 comprise flip-flops CA, CB, CC and CD, the outputs of which are transmitted through a decoder DEC to a display or indicator means IND so that the count number stored in the counter may be displayed. The outputs of the flip-flops CA, CB, CC and CD are also applied to the bases of transistors 5a, 5b, 5c and 5d, respectively, through inverters 15a, 15b, 15c and 15d and fixed resistors 16a, 16b, 16c and 16d, respectively.

The circuitry described above constitutes the light metering portion of the exposure control device. The exposure control circuitry, shown in its preferred form as a shutter control circuit, is described hereinafter.

One terminal of a capacitor 17 is connected to the stationary contact 3b of the selection switch 3, while the other terminal is connected to the negative terminal of the power source E. A normally closed switch 18 opens when the shutter is opened for initiating charging of capacitor 17. The selection switch 3 and the switches 13 and 18 are controlled in conventional manner by being interlocked with a mechanism incorporated in the camera.

Two transistors 19 and 20 form a Schmitt trigger circuit having its input terminal connected to the capacitor 17. When the voltage across the capacitor is low, as when switch 18 is closed, transistor 19 is non-conducting and transistor 20 is conducting so that an electromagnet 21 is energized. When the voltage across the capacitor 17 reaches a predetermined level, transistor 19 becomes conducting and transistor 20 becomes non-conducting so that electromagnet 21 is de-energized. When the electromagnet 21 is energized, it prevents the closing of the shutter, and when it is de-energized, the shutter is permitted to close.

The weighted resistors 4a, 4b, 4c and 4d correspond one-to-one to stages CA, CB, CC and CD, respectively, of the counter and have values Ra, Rb, Rc and Rd, respectively, which are related so that $$Ra = 2Rb = 4Rc = 8Rd.$$

The effective resistance Rt of the weighted resistors, as measured between the movable contact 3c of the selection switch 3 and the positive terminal of the power source E, varies with the count number stored in the counter ( i.e., different combinations of the weighted resistors are connected in series with photoelectric element 1 for different count numbers). The values of Rt corresponding to certain of the count numbers are calculated in the following examples:

1. When the count number stored in up-down counter 14 is zero (0), the outputs of all the bits or flip-flops CA, CB, CC and CD are at a low level (L) so that the outputs of all of the inverters 15a, 15b, 15c and 15d are at a high level (H). As a result, all of the transistors 5a, 5b, 5c and 5d are cut off or non-conducting so that the resistance Rt is infinite.

2. When the count number in the counter 14 is "1", only the output of the bit or flip-flop CA is at a high level (H) so that only the output of the inverter 15a is at a low level (L). As a result, only the transistor 5a is conducting so that the resistance Rt equals Ra. ( Rt = Ra).

3. When the count number in the up-down counter 14 is "3," the outputs of the bits or flip-flops CA and CB are at a high level (H) so that the transistors 5a and 5b are conducting. Therefore, the resistance Rt is given by $$Rt = \frac{Ra \cdot Rb}{(Ra + Rb)} = 1/3 \ (Ra).$$

4. When the count number is "10," the outputs of the bits or flip-flops CB and CD are at a high level (H) so that the transistors 5b and 5d are conducting. Therefore, the resistance Rt is given by $$Rt = \frac{Rb \cdot Rd}{Rb + Rd} = 1/5 \ (Rb) = 1/10(Ra)$$

Thus, it will be apparent that the resistance Rt is inversely proportional to the count number n in up-down counter 14 and is given by $$Rt = 1/n \ (Ra) \quad (1).$$

where $n \leq 15$ in the instant embodiment.

Operation of the exposure control system of FIG. 1 will now be described. First, the initial state before the shutter release button is depressed will be described. Then, operation of the device when the shutter release button is depressed will be described.

In the normal state in which the shutter release button is not depressed, the movable contact 3c of the selection switch 3 contacts the stationary contact 3a so that the voltage at contact 3c is given by $$V1 = \frac{R1 \cdot E}{R1 + Rt} \quad (2),$$

where R1 is the resistance of the photoelectric cell 1 and E is the voltage level of the power source. Thus, because the variable resistance circuit comprising weighted resistors 4a, 4b, 4c and 4d is connected in series with the photoelectric cell 1, the current through the variable resistance circuit and the voltage V1 at the junction of the variable resistance circuit and the photoelectric cell vary in accordance with the resistance of the photoelectric cell and in accordance with the count number n.

The voltage V2 at the armature or brush 6a of the variable resistor 6 is given by $$V2 = \frac{R2 \cdot E}{R2 + R3} \quad (3).$$

where R2 is the resistance of the variable resistor 6 between the brush 6a and the negative terminal of the power source, and R3 is the resistance between the brush 6a and the positive terminal of the power source.

Voltages V1 and V2 are compared with each other in the comparator circuit comprising the transistors 7, 8, 9 and 10, as will be described in more detail with reference to the following examples, which describe the operation of the comparator circuit for different relationships of voltages V1 and V2:

a. V1 > V2:

Transistors 7 and 9 are conducting and transistors 8 and 10 are non-conducting. Because the collectors of transistors 9 and 10 are at a high level (H) and a low level (L), respectively, AND gate 11 is open and AND gate 12 is closed, so that the output pulses of the pulse generator PG are applied through the AND gate 11 to input terminal B of up-down counter 14. The counter 14 therefore counts the pulses in the descending order so that the count number is reduced. Because the effective resistance Rt in series with photoelectric cell 1 is given by 1/n(Ra), resistance Rt is increased, which causes voltage V1 (see Eg. (2) ) to be decreased.

b. V1 < V2:

Transistors 8 and 10 are conducting and transistors 7 and 9 are non-conducting. AND gate 12 is open and AND gate 11 is closed, so that the output pulses of the pulse generator PG are applied to input terminal F of up-down counter 14. The up-down counter 14 therefore counts the pulses in the ascending order so that the count number is increased. Thus, the effective resistance Rt is decreased, causing voltage V1 to be increased.

c. V1 = V2:

The up-down counter 14 continues to count pulses in the ascending order or the descending order until voltage V1 equals V2, at which time transistors 7, 8, 9 and 10 are all rendered conductive, opening both AND gates 11 and 12. Consequently, the output pulses of the pulse generator PG are applied simultaneously to both input terminals F and B of the counter so that the counter stops counting. In this case, from Eqs. (2) and (3)

$$\frac{R2 \cdot E}{R2 + R3} = \frac{R1 \cdot E}{R1 + Rt}$$

Hence, $$Rt = \left(\frac{R3}{R2}\right) \cdot R1$$

The above relation satisfies the condition for balancing the bridge circuit.

The resistance R1 of the photoelectric cell 1 is given by $$R1 = K1/B,$$

where K1 is a proportionality constant, and B is the brightness of the subject to be photographed. Therefore, the effective resistance Rt is given by $$Rt = \left(\frac{K1 \cdot R3}{R2}\right) \cdot \frac{1}{B} \quad (4).$$

If the image brightness B should thereafter change, causing voltage V1 to become unequal to voltage V2, the comparator circuit will control AND gates 11 and 12 [as described in examples (a) and (b) above] so that the counter will be stepped to a new count number wherein V1 again is equal to V2, at which time counting is once again interrupted. Thus, the count number is continuously automatically adjusted to maintain voltages V1 and V2 equal so that the count number and the resistance Rt of the variable resistance circuit are proportional directly and inversely, respectively, to the instantaneous brightness of the object to be photographed.

When the shutter button is depressed, the photoelectric cell 1 is retracted from the optical path between the camera lens and the film. Immediately before the cell is retracted, memory switch 13 is opened so that the transmission of pulses from the pulse generator PG to the up-down counter 14 (which is not counting because V1 = V2) is interrupted, so that the counter stores the count number which was in the counter immediately before the cell 1 was retracted. The resistance Rt is proportional to the count number [Equation (1)], and inversely proportional to the intensity of light B incident upon the cell 1 before it is retracted from the optical path is proportional to Rt [Equation (4)].

Shortly thereafter, the movable contact 3c of the selection switch 3 is switched to close the stationary contact 3b, and immediately thereafter the shutter is opened and the switch 18 is opened so that the capacitor 17 and the effective resistance Rt are connected in series to form a CR time constant circuit with respect to the power source E. When the voltage across the capacitor 17 is low, the transistors 19 and 20 of the Schmitt trigger circuit are non-conducting and conducting, respectively, so that the electromagnet 21 is energized to hold the shutter open. When the voltage across the capacitor 17 reaches a predetermined level, the Schmitt trigger circuit switches states so that the electromagnet 21 is de-energized to permit the shutter to close.

The exposure time $t$ is the time required for the voltage across the capacitor 17 to reach a predetermined level, and is given by $$t = K2 \, Rt \, C \quad (5),$$

where C is the capacitance of the capacitor 17 and K2 is a proportionality constant.

Eliminating Rt between Eqs. (4) and (5), we have $$t = K1 \, K2 \, C \, \left(\frac{R3}{R2}\right) \frac{1}{B} \quad (6).$$

Thus, it is seen that the exposure time $t$ is inversely proportional to the brightness B of the subject. It is therefore possible to automatically provide the optimum exposure time for the brightness of the subject when the proportionality constants are suitably selected. The proportionality constant (R3/R2) may be varied by adjusting brush 6a of the variable resistor in accordance with such exposure factors as the film speed and the stop value of a camera lens or the like so that the exposure time may be varied accordingly.

The count number $n$ of the up-down counter 14 is given from Eqs. (1) and (5) by $$n = \frac{K2 \, C \, Ra}{t}$$

Thus, the count number $n$ is inversely proportional to the exposure time $t$. The count number may be displayed through the decoder DEC by the display or indicator means IND so that an operator may know the exposure time which has been automatically selected to provide optimum exposure.

Figure 2:
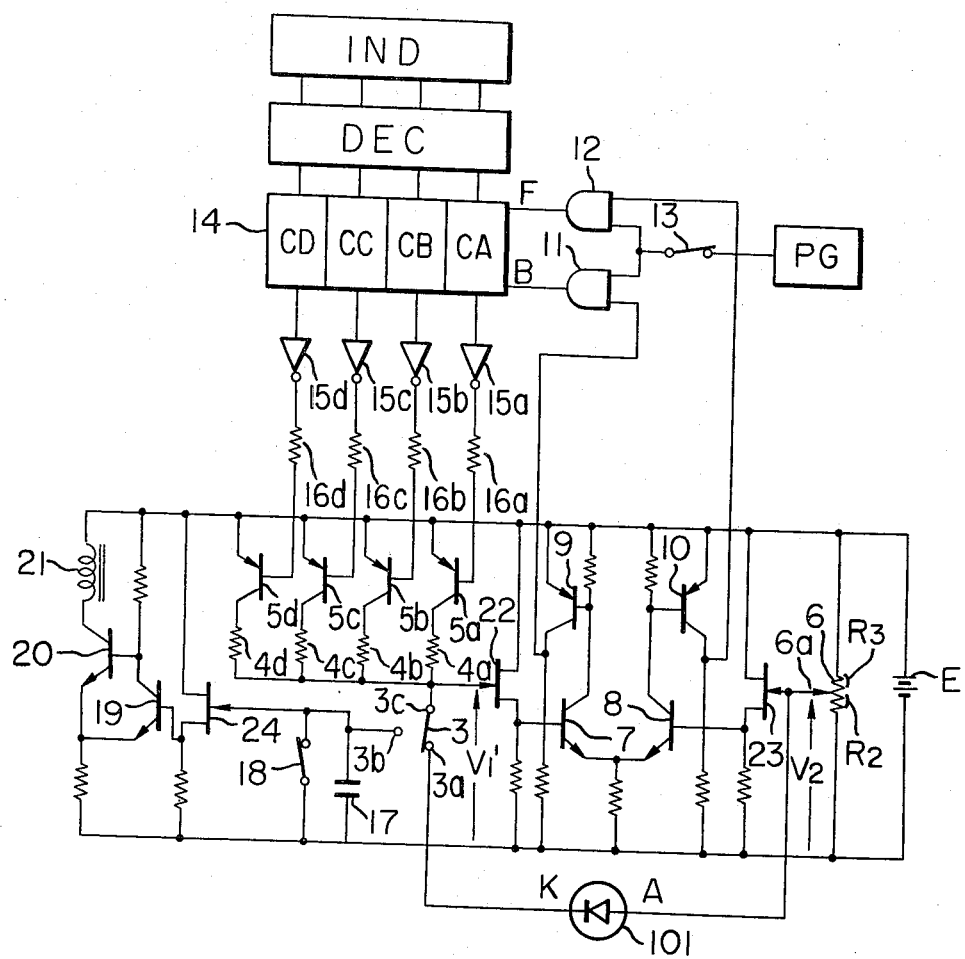
FIG. 2 shows another automatic exposure control system of the invention.

The light metering circuity of a second embodiment of the invention, shown in FIG. 2, is substantially similar in construction to that of the first embodiment described hereinabove with reference to FIG. 1, except that field-effect transistors 22,23 and 24 have been added and that a photovoltaic element 101, such as a photodiode, is used instead of a photoelectric cell 1. The field-effect transistors 22 and 23 are employed in order to increase the input impedances of the comparator circuit, comprising transistors 7, 8, 9 and 10, and the field-effect transistor 24 is inserted to increase the input impedance of the Schmitt trigger circuit, comprising transistors 19 and 20.

The cathode K of the photodiode 101 is connected to the stationary contact 3a of the selection switch 3 and the anode A is connected to the brush 6a of the variable resistor 6 so that the photodiode is connected between the input terminals of the comparator circuit when switch 3 is in the normal position in which movable contact 3c closes contact 3a.

When the voltage V1' at the movable contact 3c of the selection switch 3 becomes equal to the voltage V2' at the brush 6a of the variable resistor 6, the up-down counter 14 stops counting. Then the voltage across the photovoltaic element 101 is zero so that the output current IL of the element 101 is a short-circuit current which varies in proportion to the brightness of a subject over a wide range and is given by

IL = K3 B, where K3 is a proportionality constant. In the photodiode, the output current IL flows from the anode A to the cathode K. The voltage V1' is given by V1' = E − (Rt IL)

and the voltage V2' is given by $$V2' = \left(\frac{R2}{R2 + R3}\right) E.$$

If V1' = V2', we have $$Rt = \left(\frac{R3\ E}{R2 + R3}\right) \frac{1}{IL} = \left(\frac{R3\ E}{(R2 + R3)\ K3}\right) \frac{1}{B}$$

Thus, the combined resistance Rt is inversely proportional to the brightness B of the subject so that the exposure t is also in inverse proportion to the brightness B of the subject [see Eq. (5)].

In both the first and second embodiments, electronic shutter devices with binary up-down counters have been described, but it is to be understood that an electronic shutter device with a binary-coded decimal, octal, hexadecimal or inverted binary-coded up-down or reversible counter may be provided and that an up-down counter with more than four bits may also be used. Furthermore, in the first and second embodiments, the exposure time has been described as being controlled in response to the count number stored in the digital counter, but it is understood that, alternatively, the lens aperture or stop may be controlled in response to the count number stored in the digital counter.

As described hereinbefore, according to the present invention the automatic exposure control device may store or memorize the brightness of a subject in a digital counter without logarithmic reduction so that the circuitry may be simple in construction. Adverse effects on the operation of the circuit due to temperature variations are thereby minimized so that exposure may be controlled over a wide range with a higher degree of accuracy than the exposure control devices of the prior art. Moreover, the optimum exposure factor, which may be the exposure time or stop or aperture setting and which may continuously vary with time, can be positively confirmed by the operator by referring to a digital indicator employing light emitting diodes, which provide a better display and are more durable than the ammeters presently employed as indicator devices.

While preferred embodiments of the invention have been shown and described, it will be apparent to those skilled in the art that changes can be made in these embodiments without departing from the principles and spirit of the invention, the scope of which is defined in the appended claims.

The invention claimed is:

1. An automatic exposure control system for a camera, the system comprising:
   counter means;
   variable resistance means having a resistance which varies in accordance with the count in said counter means;
   light responsive means;
   means for passing a current proportional to the intensity of light incident on said light responsive means through a circuit including said variable resistance means and said light responsive means connected in series;
   count control means for adjusting the count in said counter means to maintain the voltage at a point at which said variable resistance means and said light responsive means are connected at a predetermined voltage level; and
   exposure control means for controlling the exposure of film in said camera in accordance with said count.

2. An exposure control system as set forth in claim 1, further comprising means for enabling adjustment of said predetermined voltage level in accordance with the adjustment of exposure factors, such as film speed.

3. An automatic exposure control system for a camera, the system comprising:
   counter means;
   variable resistance means having a resistance which varies in accordance with the count in said counter means;
   light responsive means connected in circuit with said variable resistance means for varying the voltage at a point in said circuit in accordance with the intensity of light incident on said light responsive means;
   count control means for adjusting the count in said counter means to maintain the voltage at said point at a predetermined voltage level; and
   exposure control means for controlling the exposure of film in said camera in accordance with said count;
   said counter means comprising a reversible counter, and said count control means comprising means for stepping the counter in a first direction when the voltage at said point is below said predetermined voltage level and for stepping the counter in the opposite direction when the voltage at said point is above said predetermined voltage level.

4. An exposure control system as set forth in claim 3, wherein said reversible counter comprises a pulse counter having first and second input terminals to which pulses may be applied for stepping said pulse counter in said first and opposite directions, respectively, and wherein the last-mentioned means comprises comparator means for producing first and second output signals when the voltage at said point is respectively above and below said predetermined level and means responsive to said first and second output signals for applying pulses to said first and second input terminals, respectively, of said pulse counter.

5. An exposure control system as set forth in claim 4, wherein said comparator means has first and second input terminals connected to said point and to means for establishing said predetermined voltage level, respectively, and wherein said light responsive means comprises a photovoltaic device connected between said first and second input terminals.

6. An exposure control system as set forth in claim 1, wherein said variable resistance means comprises a plurality of weighted resistors corresponding to respective counting stages of said counter means, each of the resistors being adapted to conduct current in response to a particular condition of the corresponding counting stage of said counter means.

7. An exposure control system as set forth in claim 1, further comprising digital indicator means for displaying information relating to the count in said counter means.

8. An exposure control system as set forth in claim 1, further comprising means for interrupting adjustment of the count by said count control means in response to actuation of the shutter release mechanism of the camera.

9. An exposure control system as set forth in claim 1, wherein the exposure control means comprises shutter control means for controlling the exposure time of the camera in accordance with the resistance of said variable resistance means.

10. An exposure control system as set forth in claim 9, wherein said shutter control means comprises:
a capacitor;
switch means for connecting said variable resistance means and said capacitor in series in response to actuation of the shutter release mechanism of the camera;
an electromagnet for holding the shutter open when the electromagnet is energized and for permitting the shutter to close when the electromagnet is de-energized; and
means for de-energizing said electromagnet when the voltage across said capacitor reaches a predetermined voltage.

11. An exposure control system as set forth in claim 1, wherein said light responsive means comprises a photoconductive cell.

12. An automatic light metering system comprising:
counter means;
variable resistance means having a resistance which varies in accordance with the count in said counter means;
light responsive means;
means for passing a current porportional to the intensity of light incident on said light responsive means through a circuit including said variable resistance means and said light responsive means connected in series; and
control means for adjusting the count in said counter means to maintain the voltage at a point at which said variable resistance means and said light responsive means are connected at a predetermined voltage level.

13. A light metering system as set forth in claim 12, further comprising means for enabling adjustment of said predetermined voltage level in accordance with the adjustment of exposure factors, such as film speed.

14. An automatic light metering system comprising:
counter means;
variable resistance means having a resistance which varies in accordance with the count in said counter means;
light responsive means connected in circuit with said variable resistance means for varying the voltage at a point in said circuit in accordance with the intensity of light incident on said light responsive means; and
control means for adjusting the count in said counter means to maintain the voltage at said point at a predetermined voltage level;
said counter means comprising a reversible counter, and said control means comprising means for stepping said counter in a first direction when the voltage at said point is below said predetermined voltage level and for stepping said counter in the opposite direction when the voltage at said point is above said predetermined voltage level.

15. A light metering system as set forth in claim 14, wherein said reversible counter comprises a pulse counter having first and second inputs to which pulses may be applied for stepping said pulse counter in said first and opposite directions, respectively, and wherein the last-mentioned means comprises comparator means for producing first and second output signals when the voltage at said point is respectively above and below said predetermined voltage level and means responsive to said first and second output signals for applying pulses to said first and second input terminals, respectively, of said pulse counter.

16. A light metering system as set forth in claim 15, wherein said comparator means has first and second input terminals connected to said point and to means for establishing said predetermined voltage level, respectively, and wherein said light responsive means comprises a photovoltaic device connected between said first and second input terminals of said comparator means.

17. A light metering system as set forth in claim 12, wherein said variable resistance means comprises a plurality of weighted resistors corresponding to respective counting stages of said counter means, each of the resistors being adapted to conduct current in response to a particular condition of the corresponding counting stage of said counter means.

18. A light metering system as set forth in claim 12, further comprising digital indicator means for displaying information relating to the count in said counter means.

19. A light metering system as set forth in claim 12, wherein said light responsive means comprises a photoconductive cell.

20. A light metering system as set forth in claim 12, wherein said control means comprises means for adjusting the count in said counter means to vary said variable resistance means in inverse proportion to the intensity of the light incident on said light responsive means.

21. A light metering system as set forth in claim 20, wherein said current passing means comprises a source of voltage connected across said variable resistance means and said light responsive means in series.

22. A light metering system as set forth in claim 21, wherein said control means comprises means for comparing the voltage at said point with a reference voltage.

* * * * *